Patented Aug. 23, 1949

2,479,798

UNITED STATES PATENT OFFICE 2,479,798

WELDING FLUXES

Rene D. Wasserman, New York, N. Y.

No Drawing. Application January 15, 1946,
Serial No. 641,401

3 Claims. (Cl. 148—26)

My invention relates to welding fluxes for ferrous metals, such as cast iron, steel and other alloys in which iron predominates. More particularly, it relates to pulverulent compositions designed to improve the gas welding of these metals.

Pulverulent flux compositions are commonly employed in the gas welding of ferrous metals, particularly of cast iron. They are usually applied by sprinkling them over the areas to be welded and those adjacent thereto. Additional amounts of flux composition are brought to the weld area during the welding operation by frequently dipping the heated welding rod into a supply of the material. Some of the composition adheres to the heated rod and becomes fused, when the torch is applied thereto in the vicinity of the weld.

These flux compositions generally contain a number of different ingredients, all finely powdered and thoroughly blended. Such ingredients are selected and their proportions chosen to develop the desired protective and refining action of the flux, as well as to impart to it a fusion point within the required range of temperature. Borax, soda ash, various silicates such as glass and sand, carbonaceous materials, such as lamp black and charcoal, heavy metal oxides, such as those of iron and manganese, and alkali metal salts, such as common salt and salt petre, are among the ingredients most frequently employed.

I have found that the properties of such flux compositions can be considerably improved by providing some of the chemical ingredients in special forms and combinations, not heretofore employed for this purpose. In particular, I employ in my new compositions sodium carbonate monohydrate in place of ordinary soda ash (substantially anhydrous sodium carbonate). Also I employ an alkali metal pentaborate instead of borax. Furthermore, I prefer to use graphite powder, as the source of carbon, rather than the other carbonaceous materials commonly employed. In this manner I have succeeded in preparing flux compositions that are surprisingly superior to those previously employed for the welding of ferrous metals.

My new flux compositions possess the desired property of adhering to the hot welding rod, when the latter is dipped therein during the welding operation. They do this without the necessity of adding moisture or glue, as has been common practice, and which is apt to render the flux inhomogeneous. My fluxes are free from any tendency to burst away from the hot welding rod due to excessive vapor formation or simply to peel off from the rod. Apparently, the required amount of moisture is uniformly present in my flux compositions, in the form of the water of crystallization that is combined with the sodium carbonate and with the alkali metal pentaborate.

The alkali metal pentaborate assists in the formation of a light flowing slag that considerably improves the surface of the weld and its metallurgical properties. It is preferably employed in its hydrated form, wherein the water of crystallization supplies some of the desired moisture to the compositions in a uniform, relatively stable form. This ingredient is superior to borax, because its relatively low melting point and chemical instability appear to impart exceptionally good fluxing properties to the compositions.

The advantage of the graphite employed in my new compositions over the other carbonaceous materials commonly used appears to be due to its high thermal conductivity coupled with a low co-efficient of expansion and to its relative chemical inertness. While I believe that the above theories as to the action of my special ingredients are correct, I do not of course wish to be bound thereby. Whatever may be the true explanations, it is apparent that the combination of these ingredients in my new flux compositions does produce most desirable effects which render my flux markedly superior to those previously known.

My new flux compositions also contain additional, conventional ingredients. Thus, they generally include some silica to aid in slag formation, an alkali metal salt, preferably the nitrate, to insure the desired fluidity, and an oxide of a heavy metal, such as iron or manganese, likewise to assist in slag formation and to improve the metallurgical properties of the weld. I have found flux compositions made up as follows to be eminently suitable for use in the gas welding of ferrous metals:

| | Parts by weight |
|---|---|
| Sodium carbonate monohydrate | 30 to 50 |
| Alkali metal pentaborate (hydrated) | 10 to 30 |
| Alkali metal nitrate | 20 to 40 |
| Silica | 5 to 20 |
| Graphite | 1 to 10 |
| Oxide of iron or manganese | 1 to 10 |

These compositions, prepared by intimately admixing the various powdered ingredients, are distinguished by their ability to uniformly adhere to the hot welding rod and by their excellent fluidity. The welds formed with the use of these flux compositions do not harden, but remain soft and very tough, which makes it easier to machine them. Other features of the welds thus produced are their uniformity, strength and freedom from porosity.

For the purpose of illustrating my invention I shall give two examples of specific flux compositions, both of which are designed for use in the gas welding of cast iron. Obviously, many variations in the particular ingredients and proportions are possible without departing from the spirit of my invention. The invention embraces all of the compositions coming within the scope of the appended claims, and obvious equivalents of such compositions.

Example I

A homogeneous, pulverulent composition is obtained by intimately mixing the following ingredients in dry, powdered form:

| | Parts by weight |
|---|---|
| Sodium carbonate monohydrate | 39 |
| Potassium pentaborate (hydrated) | 20 |
| Potassium nitrate | 30 |
| Silica | 7.5 |
| Graphite | 1 |
| Ferric oxide | 2.5 |

This composition, when applied in the usual manner for the welding of cast iron, will be found to possess excellent fluxing properties that are superior to those of the fluxes heretofore employed, particularly with respect to uniform adhesion to the hot welding rod and as regards the metallurgical properties of the weld.

Example II

A flux composition is prepared as described in Example I by mixing the following ingredients:

| | Parts by weight |
|---|---|
| Sodium carbonate monohydrate | 45 |
| Sodium pentaborate (hydrated) | 15 |
| Sodium nitrate | 27.5 |
| Silica | 7.5 |
| Graphite | 1.5 |
| Ferric oxide | 3.5 |

This composition likewise exhibits superior fluxing properties, when applied in the welding of cast iron.

I claim:

1. A homogeneous, pulverulent welding flux composition comprising as the essential ingredients from 30 to 50 parts by weight of sodium carbonate monohydrate, from 10 to 30 parts by weight of a hydrated alkali metal pentaborate and from 1 to 10 parts by weight of graphite.

2. A homogeneous, pulverulent welding flux composition composed of the following ingredients:

| | Parts by weight |
|---|---|
| Sodium carbonate monohydrate | 30 to 50 |
| Alkali metal pentaborate (hydrated) | 10 to 30 |
| Alkali metal nitrate | 20 to 40 |
| Silica | 5 to 20 |
| Graphite | 1 to 10 |
| Iron oxide | 1 to 10 |

3. A homogeneous, pulverulent welding flux composition composed of the following ingredients:

| | Parts by weight |
|---|---|
| Sodium carbonate monohydrate, approximately | 39 |
| Potassium pentaborate (hydrated), approximately | 20 |
| Potassium nitrate, approximately | 30 |
| Silica, approximately | 7.5 |
| Graphite, approximately | 1 |
| Ferric oxide, approximately | 2.5 |

RENE D. WASSERMAN.

REFERENCES CITED

The following references are of record in the file of this patent:

UNITED STATES PATENTS

| Number | Name | Date |
|---|---|---|
| 932,964 | Clark | Aug. 31, 1909 |
| 1,256,429 | Beaulieu | Feb. 12, 1918 |
| 1,271,125 | Braund et al. | July 2, 1918 |
| 2,357,014 | Merlub-Sobel et al. | Aug. 29, 1944 |

FOREIGN PATENTS

| Number | Country | Date |
|---|---|---|
| 19,326 | Great Britain, 1900 | July 29, 1901 |
| 409,525 | Great Britain | May 3, 1934 |